United States Patent
Quilici et al.

(10) Patent No.: US 10,237,951 B1
(45) Date of Patent: Mar. 19, 2019

(54) SOLID-STATE LUMINAIRE FOR CREATING COLOR GRADIENTS

(71) Applicants: Michael A. Quilici, Essex, MA (US); Holger Sacher, Augsburg (DE); Seung Cheol Ryu, Marblehead, MA (US)

(72) Inventors: Michael A. Quilici, Essex, MA (US); Holger Sacher, Augsburg (DE); Seung Cheol Ryu, Marblehead, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/803,938

(22) Filed: Nov. 6, 2017

(51) Int. Cl.
| | |
|---|---|
| F21V 13/10 | (2006.01) |
| H05B 37/02 | (2006.01) |
| F21V 7/00 | (2006.01) |
| F21V 14/06 | (2006.01) |
| F21V 3/00 | (2015.01) |
| F21V 19/00 | (2006.01) |
| F21S 8/06 | (2006.01) |

(52) U.S. Cl.
CPC .......... *H05B 37/0227* (2013.01); *F21S 8/063* (2013.01); *F21V 3/00* (2013.01); *F21V 7/0008* (2013.01); *F21V 14/06* (2013.01); *F21V 19/0015* (2013.01)

(58) Field of Classification Search
None
See application file for complete search history.

(56) References Cited

U.S. PATENT DOCUMENTS

| 9,587,805 B2 | 3/2017 | Ryu et al. |
| 2014/0070724 A1 | 3/2014 | Gould et al. |
| 2014/0160719 A1* | 6/2014 | Van Boven ........... F21S 10/026 362/1 |
| 2017/0299146 A1 | 10/2017 | Meerbeek et al. |
| 2018/0017233 A1* | 1/2018 | Takeshita ........... H05B 33/0845 |

FOREIGN PATENT DOCUMENTS

| WO | 2015125557 A1 | 8/2015 |
| WO | 2017144303 A1 | 8/2017 |
| WO | 2017144371 A1 | 8/2017 |

OTHER PUBLICATIONS

Vida, Gyorgy, International Search Report and Written Opinion of the International Searching Authority, for counterpart application PCT/US2018/059172, dated Dec. 20, 2018, European Patent Office, Rijswijk, The Netherlands, 11 pages.

* cited by examiner

*Primary Examiner* — Dedei K Hammond
(74) *Attorney, Agent, or Firm* — Yutian Ling

(57) ABSTRACT

A luminaire having an electronically adjustable light beam distribution to provide upward illumination creating color gradients on a ceiling. The color gradients may be in patterns that mimic color gradients of a sky, including, for example, color gradients that mimic sunrise, sunset, sun at different times of day, a rainy day, clouds, the sun, moon, etc. The color gradients may change over time and/or may include one or more objects, e.g. clouds, the sun, moon, etc. and/or may move and/or change over time to create a dynamic sky on the ceiling. Multiple luminaires may be controlled by a system controller to produce coordinated color gradients across the light distribution areas of the multiple luminaires.

17 Claims, 7 Drawing Sheets

SOLID-STATE LUMINAIRE FOR CREATING COLOR GRADIENTS

TECHNICAL FIELD

The present application relates to lighting, and more particularly, to a solid-state luminaire for creating color gradients on a ceiling.

BACKGROUND

Traditional lighting fixtures that provide light upwardly from a fixture in the direction of a ceiling only illuminate the ceiling with a single color of light. Also, adjustable lighting fixtures, such as those utilized in theatrical lighting, employ mechanically adjustable lenses, track heads, gimbal mounts, and other mechanical parts to adjust the angle and direction of the light output thereof. Mechanical adjustment of these components is normally provided by actuators, motors, or manual adjustment by a lighting technician.

Figure 1:
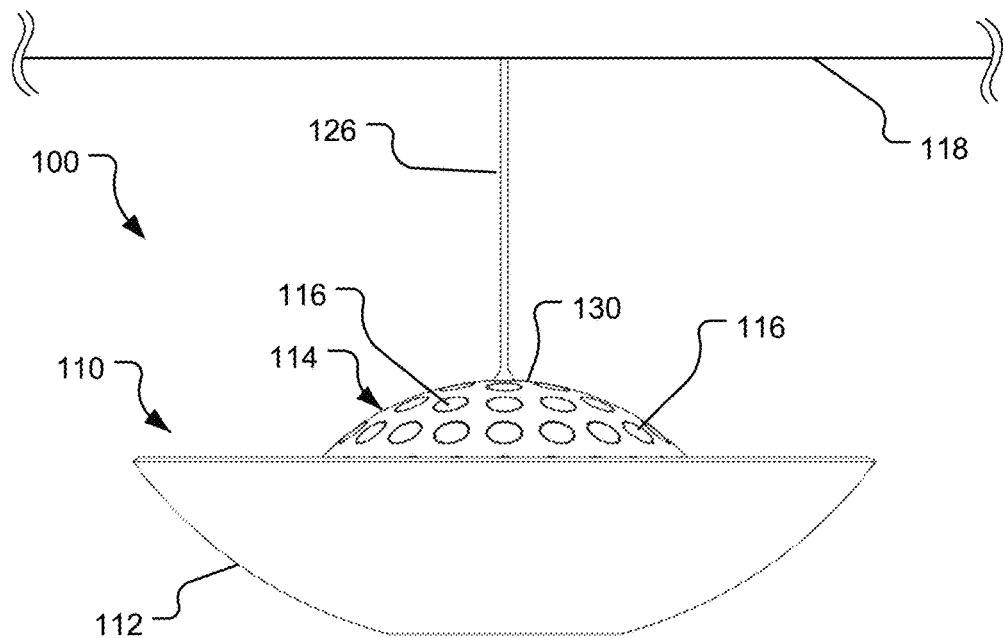
FIG. 1 is a side view of one embodiment of a luminaire consistent with the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

In accordance with an embodiment of the present disclosure, there is disclosed a luminaire having an electronically adjustable light beam distribution to provide upward illumination creating color gradients on a ceiling. In accordance with some embodiments, the color gradients may be in patterns that mimic color gradients of a sky including, for example, color gradients that mimic sunrise, sunset, sun at different times of day, a rainy day, clouds, the sun, moon, etc. The color gradients may change over time and/or may include one or more objects, e.g. clouds, the sun, moon, etc. and/or may move and/or change over time to create a dynamic sky on the ceiling. For example, the color gradients can change to mimic transition from a cloudy or rainy day to a sunny day. The rate of movement of objects mimicked by the color gradients may also change over time. For example, the color gradients may mimic moving clouds that move quickly on a windy day or that move slowly to mimic a day with minimal wind. In addition to providing decorative up-lighting, a luminaire consistent with the present disclosure may also provide functional or decorative down-lighting that may or may not be adjustable or dynamic.

In some embodiments, the disclosed luminaire includes a plurality of solid-state lamps arranged on one or more surfaces of a housing. In some cases, each lamp of the luminaire may include one or more light-emitting diodes (LEDs) and tunable electro-optic componentry configured to provide that lamp with its own electronically adjustable light beam. Also, in some cases, the disclosed luminaire may be configured to direct its emissions through additional optical componentry (e.g., such as a Fresnel lens or other fixed optics disposed in an aperture, for example, to modify the beam distributions). As will be appreciated in light of this disclosure, such a design allows for great flexibility with respect to lighting direction and distribution in a relatively compact lighting fixture.

In accordance with some embodiments, the disclosed luminaire can be communicatively coupled with a controller which can be used to electronically control the output of the LEDs individually and/or in conjunction with one another (e.g., as an array or partial array), thereby electronically controlling the output of the luminaire as a whole to produce color gradients on a ceiling. In some such cases, a luminaire controller configured as described herein may provide for electronic adjustment, for example, of the beam direction, beam angle, beam distribution, and/or beam diameter for each lamp or some sub-set of the available lamps, thereby allowing for customizing the color, brightness, spot size, position, and/or distribution of light on a ceiling. In a more general sense, and in accordance with an embodiment, the properties of the light output of a luminaire configured as described herein may be adjusted electronically without need for mechanical movements. Also, as discussed below, control of the emission of the disclosed luminaire may be provided utilizing any of a wide range of wired and/or wireless control interfaces, such as a switch array, a touch-sensitive surface or device, and/or a computer vision system (e.g., that is gesture-sensitive, activity-sensitive, and/or motion-sensitive, for example), to name a few.

In accordance with some embodiments, the disclosed luminaire can be configured as a bowl light, a pendant light, or the like which may be mounted, for example, from a ceiling, wall, floor, step, or other suitable surface, to provide up-lighting of a ceiling as will be apparent in light of this disclosure. In some other embodiments, the disclosed luminaire can be configured as a free-standing lighting device, such as a desk lamp or torchiére lamp. Numerous other suitable configurations will be apparent in light of this disclosure.

As will be appreciated in light of this disclosure, a luminaire configured as described herein may provide for flexible and easily adaptable decorative up-lighting for creating color gradients on a ceiling. In some embodiments a luminaire consistent with the present disclosure may provide changing color gradients, e.g. to mimic changing colors in the sky and/or moving objects the sky, by sequentially activating solid-state lamps that lie in on a plane intersecting the housing and the direction of movement of the change in color gradients, e.g. the moving cloud, sun, etc. In accordance with some embodiments, multiple luminaires configured as described herein may be communicatively coupled to a system controller. The system controller may control the separate luminaires to create coordinated color gradients that transition from the light distribution areas of the separate luminaires, e.g., a moving cloud or sun. To this end, the system controller may provide control signals to sequentially activating solid-state lamps of each luminaire that lie in on a plane intersecting the direction of movement of the color gradients.

As will be further appreciated in light of this disclosure, a luminaire configured as described herein may be considered, in a general sense, a robust, intelligent, lighting platform capable of producing a highly adjustable up-lighting to provide color gradients on a ceiling without requiring mechanical movement of the luminaire componentry. Some embodiments may realize a reduction in cost, for example, as a result of the use of longer-lifespan solid-state devices and reduced installation, operation, and other labor costs. Furthermore, the scalability and orientation of a luminaire configured as described herein may be varied, in accordance with some embodiments, to adapt to a specific lighting context or application.

Figure 2:
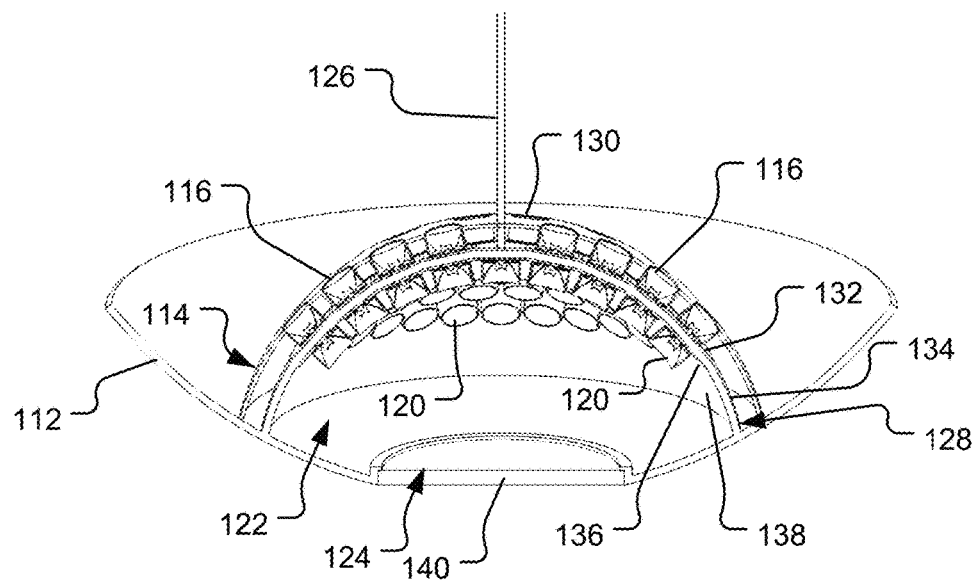
FIG. 2 is a perspective sectional view of the luminaire shown in FIG. 1.

FIGS. 1 and 2 illustrate a luminaire 100 configured in accordance with an embodiment of the present disclosure. As can be seen, the luminaire 100 includes a housing 110 including a bowl portion 112 and an interior portion 114, a plurality of solid-state lamps 116 arranged on the interior portion 114 for emitting light upwardly toward a ceiling 118 (sometimes referred to herein as "up-lighting") to illuminate the ceiling 118 with color gradients in a light distribution area. As used herein the "light distribution area" of a single luminaire is the area of a target, e.g. a ceiling, illuminated by the luminaire. As used herein "color gradient" refers to any change in color from one location in a light distribution area to another area of a light distribution area. As shown, the luminaire 100 includes an optional plurality of downwardly facing solid-state lamps 120 arranged in a plenum 122 of the housing 110 for emitting light downwardly (sometimes referred to herein as "down-lighting") through an aperture 124 in the bowl shaped portion.

The luminaire 100 may be configured as a pendant light mounted on or otherwise fixed to a ceiling 118 by a mounting rod 126 in a temporary or permanent manner, and in some such cases, a support plate optionally may be included. Electrical power to the solid-state lamps 116 and the optional downwardly facing solid-state lamps 120 may be provided by an electrical conductor passing through a central aperture in the mounting rod 116 and coupled to an electrical power source.

The bowl portion 112 of the luminaire 100 may have a generally convex bowl shape and the interior portion 114 may have a generally concave shape. The interior portion 114 may include a substrate 128 and a cover 130 portion. The plurality of solid-state lamps 116 may be mounted on a circuit board 132 coupled to the exterior surface 134 of the substrate 128. The cover 130 may be disposed over the plurality of solid-state lamps 116 with the plurality of solid-state lamps 116 positioned between the exterior surface of the substrate 134 and the cover 130. The cover 130 may include a plurality of apertures therein. Each of the plurality of solid-state 116 lamps may have an end portion positioned in an associated one of the apertures on the cover 130 so that light emitted from the plurality of solid-state lamps 116 is directed upwardly away from the interior portion 114 toward the ceiling 118. The cover 130 protects or otherwise houses the plurality of solid-state lamps 116 of the luminaire 100 within space between the cover 130 and the substrate 128.

The housing 110 may have a hollow space therein between the bowl shaped portion 112 and the interior surface 138 of the substrate 128 which defines the plenum 122. The optional plurality of downwardly facing solid-state lamps 120 may be arranged in the plenum 122 and mounted on a circuit board 136 coupled to the interior surface 138 of the substrate. Light emitted from the optional downwardly facing solid-state lamps 120 may pass through the aperture 124 in the bowl portion 112 for providing downwardly facing light into the ambient environment. The aperture 124 in the bottom of the bowl portion 112 may be closed by a translucent or transparent cover 140, e.g. a diffusing cover. Light may pass from the optional downwardly facing solid-state lamps 120 and through the cover 140. The aperture 124 and the cover 140 protect or otherwise house the optional plurality of solid-state lamps 120 of the luminaire 100 within the plenum 122.

The housing 110 may be constructed from any of a wide variety of materials, such as: aluminum (Al); copper (Cu); brass; steel; composites and/or polymers (e.g., ceramics, plastics, etc.) doped with thermally conductive material; and/or a combination thereof. Other suitable materials from which the housing 110 may be constructed will depend on a given application and will be apparent in light of this disclosure.

The geometry of the housing 110 may be customized as desired to provide up-lighting and optional down-lighting for a given target application or end-use. For example, the bowl portion 112 shown in FIGS. 1 and 2 may be omitted or may take a different shape, and the interior portion 114 may be configured with a non-planar/curved geometry. In some example cases, the portion of the housing 110 to which the plurality of solid-state lamps 116 are mounted may exhibit a hemispherical geometry (e.g., like the interior portion 114 shown in FIGS. 1 and 2). In some other example cases, the portion of the housing 110 to which the plurality of solid-state lamps 116 are mounted may exhibit a sectional hemispherical geometry. In some other example cases, the portion of the housing 110 to which the plurality of solid-state lamps 116 are mounted may exhibit an oblate hemispherical geometry. Other example suitable geometries of the portion of the housing 110 to which the plurality of solid-state lamps 116 are mounted include: concave; convex; elliptical; parabolic; hyperbolic; complex parabolic; and the like. In some other embodiments, the housing 110 may be configured with a Platonic solid-type geometry (e.g., having planar faces/sides), such as a triangular geometry, a rectangular geometry, or a trapezoidal geometry, among others. In some still other embodiments, the portion of the housing 110 to which the plurality of solid-state lamps 116 are mounted housing 110 may be configured as a cylinder, pyramid, truncated pyramid, or other hollow, geometrical cavity. Numerous suitable configurations will be apparent in light of this disclosure.

The dimensions of the housing 110 can be customized as desired for a given target application or end-use. For example, in some embodiments, the interior portion 114 of the housing in a hemispherical or spherical configuration may have a width/diameter in the range of about 2-10 inches (e.g., about 2-4 inches, about 4-6 inches, about 6-8 inches, about 8-10 inches, or any other sub-range within the range of about 2-10 inches) and may be mounted about 2-4 feet from the ceiling 118. In some embodiments, the housing 110 may have a diameter of about 8 inches±2 inches. In some other embodiments, the housing 110 may have a width/diameter greater than about 10 inches (e.g., in the range of about 10-20 inches, about 20-30 inches, about 30-40 inches, about 40-50 inches, or greater). The mounting distance from the ceiling 118 depends on the overall size of the housing 118 and housings having smaller diameters will be mounted closer to the ceiling 118 than housings 110 with larger diameters. In a more general sense, the dimensions of the housing 110 may be varied, for example, to be commensurate with the particular mounting surface on which it is to be mounted or other space which it is to occupy (e.g., suspended from a ceiling 118 or other overhead structure; extending from a wall, floor, or step; configured as a free-standing or otherwise portable lighting device). Other suitable sizes for the housing 110 will depend on a given application and will be apparent in light of this disclosure.

As previously noted, the luminaire 100 can include a plurality of solid-state lamps 116 and optional plurality of solid-state lamps 120 arrange on the housing 110. For simplicity and ease of explanation, embodiments may be described herein in connection with the solid-state lamps 116. It is to be understood, however, that the operation, mounting and configuration of the optional solid-state lamps 120 may be the same or different from the solid-state lamps 116.

Figure 3:
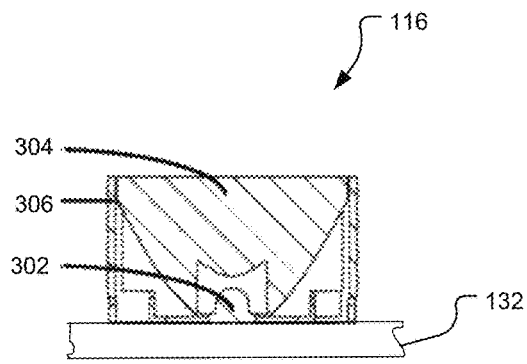
FIG. 3 is a cross-sectional view of one embodiment of a solid-state lamp coupled to a circuit board in a luminaire consistent with the present disclosure.

FIG. 3 illustrates a solid-state lamp 116 mounted on a circuit board in accordance with an embodiment of the present disclosure. As can be seen, and as discussed below, a given solid-state lamp 116 can include one or more solid-state emitters 302 populated on a printed circuit board (PCB) 132 (or other suitable intermediate/substrate) and optically coupled with an optics assembly 304. In some instances, the optics assembly 304 and solid-state emitter(s) 302 may be disposed within or otherwise protected by a head 306 of solid-state lamp 116. The features and quantity/density of solid-state lamps 116 utilized in the luminaire 100 may be customized, as desired to provide up-lighting for a given target application or end-use, for illuminating a ceiling with color gradients. Numerous suitable configurations will be apparent in light of this disclosure.

A given solid-state emitter 302 may be any of a wide variety of semiconductor light source devices. Some suitable solid-state emitters 302 include, for example: a light-emitting diode (LED) (e.g., high-brightness, bi-color, tri-color, quad-color, etc.); an organic light-emitting diode (OLED); a polymer light-emitting diode (PLED); a laser diode and/or any combination thereof. Also, a given solid-state emitter 302 may be configured to emit wavelength(s) from any spectral band (e.g., visible spectral band, infrared spectral band, ultraviolet spectral band, etc.), as desired for a given target application or end-use. Some embodiments may include one or more white light-emitting solid-state emitters 302, while some other embodiments may include one or more multiple-color solid-state emitters 302 (e.g., bi-color LEDs, tri-color LEDs, quad-color LEDs, sub-combinations of multiple single color LEDs, etc.). Furthermore, a given solid-state emitter 302 can be packaged or non-packaged, as desired, and in some cases may be populated on a printed circuit board (PCB) 132 or other suitable intermediate/substrate, as will be apparent in light of this disclosure. Other suitable solid-state emitter 302 configurations will depend on a given application and will be apparent in light of this disclosure.

The optics assembly 304 may be configured to transmit the wavelength(s) of interest (e.g., visible, ultraviolet, infrared, etc.) of the light emitted, for example, by the associated solid-state emitter(s) 302. In some cases, the optics assembly 304 of a given solid-state lamp 116 may include an optical structure including any of a wide variety of transparent/translucent materials, such as, for example: a polymer, such as poly(methyl methacrylate) (PMMA) or polycarbonate; a ceramic, such as sapphire (Al2O3) or yttrium aluminum garnet (YAG); a glass; and/or any combination thereof. In some cases, the optics assembly 304 of a given solid-state lamp 116 may include electronically controllable componentry which may be used to modify the output of the host solid-state lamp 116.

For example, a given optics assembly 304 may include one or more electro-optic tunable lenses which can be electronically adjusted to vary the angle, direction, and/or size (among other attributes) of the light beam output by a given solid-state lamp 116. In some cases, the optics assembly 304 of a given solid-state lamp 116 may include optical components, such as, for example: a reflector; a diffuser; a polarizer; a brightness enhancer; and/or a phosphor material (e.g., which converts light received thereby to light of a different wavelength). As previously explained, the optics assembly 304 of a given solid-state lamp 116 may be encased by or otherwise disposed within a head 306. Other suitable types and configurations for the optics assembly 304 of a given solid-state lamp 116 may depend on the given application and will be apparent in light of this disclosure.

Figure 4:
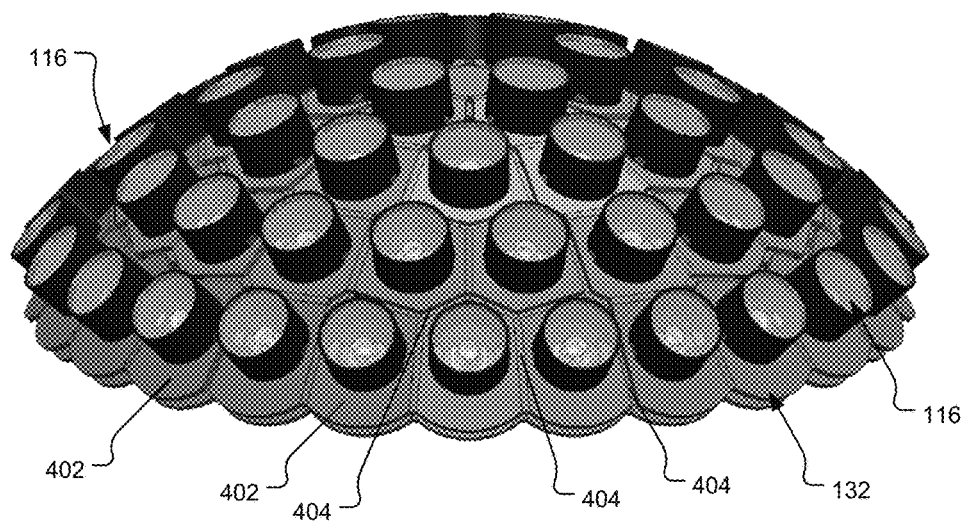
FIG. 4 is top perspective view the printed circuit board and solid-state lamps of the luminaire shown in FIG. 1.

As previously noted, the solid-state lamps 116 may be mounted on a circuit board 132 coupled to the housing 110. The configuration and dimensions of the circuit board 132 will depend on the shape and configuration of a housing 110 in a given application. In some embodiments, the circuit board 132 may be a rigid flexible circuit board shaped to conform to the surface of the housing 110 to which the circuit board 132 is mounted. For example, FIG. 4 illustrates on example of a plurality of solid-state lamps 116 mounted to a rigid flexible circuit board 132 shaped to conform to a hemispherical or spherical housing surface, e.g. as shown in FIGS. 1 and 2.

In the illustrated embodiment, the flexible rigid circuit board 132 has a plurality of separate sections 402 coupled to each other by associated fold lines 404, e.g. at the sides, tops and/or bottoms of the separate sections 402. A solid-state lamp 116 may be mounted to one or more of the separate sections 402 of the circuit board 132. In some embodiments, for example, a solid-state lamp 116 may be mounted to each of the separate sections 402 of the circuit board 132. The circuit board 132 is configured to fold at one or more of the fold lines 404 to conform to the shape of the housing 110. The circuit board 132 includes conductive paths and optional driving electronics for providing power and data to each of the solid-state lamps 116 coupled thereto. The conductive paths may be combined at one or more associated connectors for coupling a controller to the paths for controlling operation of the solid-state lamps 116.

As previously noted, the solid-state lamps 116 of the luminaire 100 can be electronically controlled individually and/or in conjunction with one another, for example, to provide highly adjustable light emissions from the luminaire 100 to illuminate a ceiling with static or dynamic color gradients. In accordance with some embodiments, the color gradients may be in patterns that mimic color gradients of a sky including, for example, color gradients that mimic sunrise, sunset, sun at different times of day, a rainy day, clouds, the sun, moon, etc. The color gradients may change over time and/or may include one or more objects, e.g. clouds, the sun, moon, etc. and/or may move and/or change over time to create a dynamic sky on the ceiling. For example, the color gradients can change to mimic transition from a cloudy or rainy day to a sunny day. The rate of movement of objects mimicked by the color gradients may also change over time. In accordance with some embodiments, the color gradients may be in patterns that mimic color gradients associated with other environments, for example, an underwater environment with color gradients that mimic moving water, fish, etc.

Figure 5:
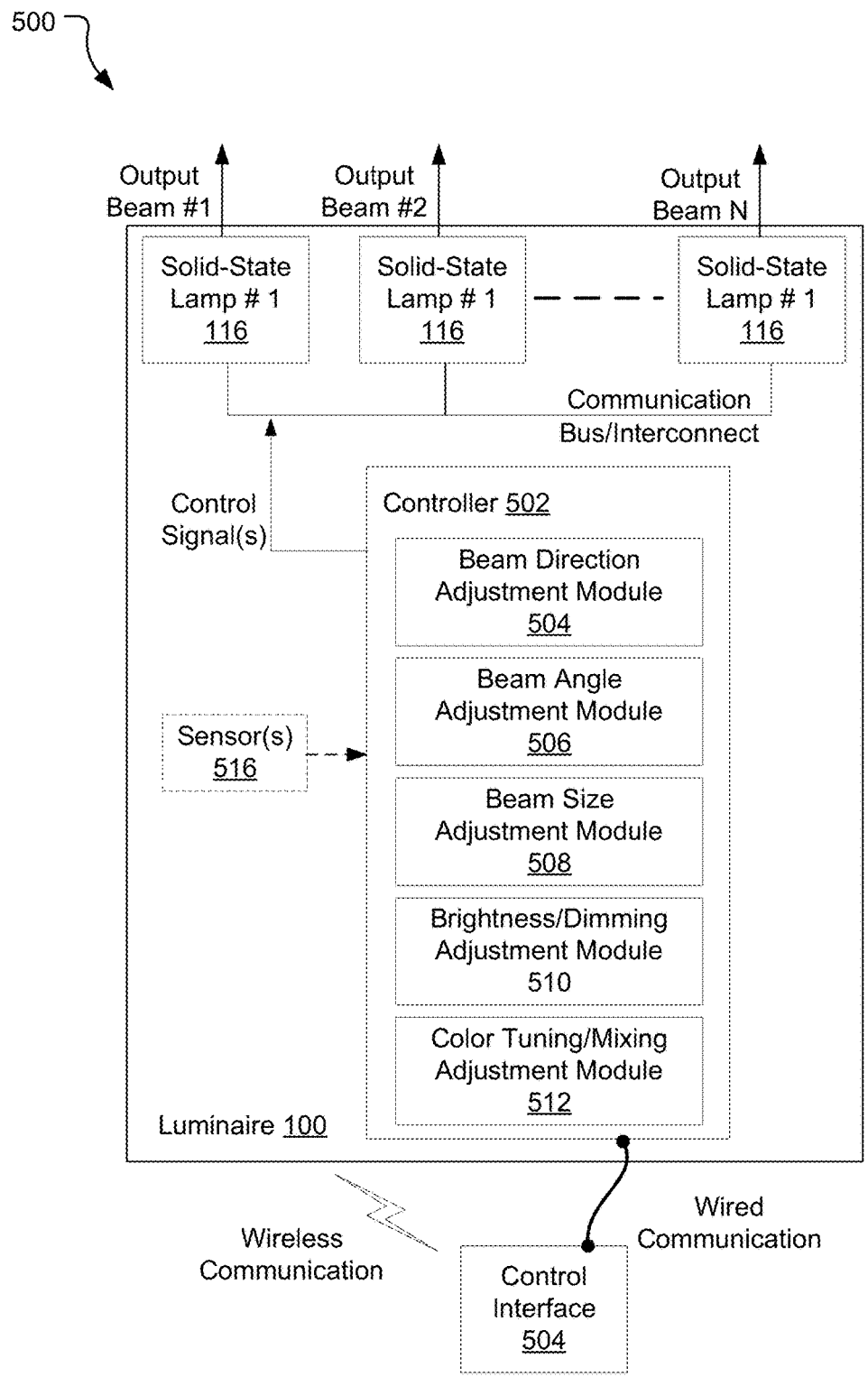
FIG. 5 is a block diagram of one embodiment of a lighting system consistent with the present disclosure.

To this end, the luminaire 100 may include or otherwise be communicatively coupled with one or more controllers. For example, FIG. 5 is a block diagram of a lighting system 500 a configured in accordance with an embodiment of the present disclosure. Here, a controller 502 is operatively coupled (e.g., by a communication bus/interconnect) with the solid-state lamps 116 1-N of the luminaire 100. The controller 502 may be populated on the circuit board 132, on the luminaire 100, e.g. in the plenum 122, or in a separate location such as in the ceiling 118. In this example case, controller 502 may output a control signal to any one or more of the solid-state lamps 116 and may do so, for example, based on wired (e.g. through one or more conductors passing through a mounting rod 126) and/or wireless (e.g. radio-based or optical) input received from one or more control interfaces 504, discussed below. As a result, the luminaire 100 may be controlled in such a manner as to output any number of output beams 1-N, which may be varied in beam direction, beam angle, beam size, beam distribution, brightness/dimness, and/or color, as desired for a given target application or end-use.

Other suitable controller configurations for the controller 502 will be apparent in light of this disclosure. For example, each solid-state lamp 116 1-N of the luminaire 100 may include its own controller 502. In such and embodiment, each solid-state lamp 116 may be considered as effectively having its own mini-controller, thus providing the luminaire 100 with a distributed controller 502.

In accordance with some embodiments, a given controller 502 may host one or more lighting control modules, such as a beam direction adjustment module 504, a beam angle adjustment module 506, a beam size adjustment module 508, a brightness/dimming adjustment module 510 and/or a color tuning/mixing adjustment module 512. The controller 502 can thus be programmed or otherwise configured to output one or more control signals, for example, to adjust the operation of: (1) the one or more solid-state emitters 302 of a given solid-state lamp 116 and/or (2) the optics assembly 304 of a given solid-state lamp 302. For example, in some cases, a given controller 502 may be configured to output a control signal to control whether the beam is on/off, as well as control the beam direction, beam angle, beam distribution, and/or beam diameter of the light emitted by a given solid-state lamp 116. In some instances, a given controller 502 may be configured to output a control signal to control the intensity/brightness (e.g., dimming, brightening) of the light emitted by a given solid-state emitter 302. In some cases, a given controller 502 may be configured to output a control signal to control the color (e.g., mixing, tuning) of the light emitted by a given solid-state emitter 302.

Thus, if a given solid-state lamp 116 includes two or more solid-state emitters 302 configured to emit light having different wavelengths, the control signal may be used to adjust the relative brightness of the different solid-state emitters 302 in order to change the mixed color output by that solid-state lamp 116. In some cases, a given controller 502 may utilize a digital communications protocol, such as a digital multiplexer (DMX) interface, a Wi-Fi™ protocol, a digital addressable lighting interface (DALI) protocol, a ZigBee protocol, or any other suitable communications protocol, wired and/or wireless (e.g. radio-based or optical), as will be apparent in light of this disclosure. In some still other cases, a given controller 502 may be configured as a terminal block or other pass-through such that a given control interface 504 is effectively coupled directly with the individual solid-state emitters 302 of the luminaire 100. Numerous suitable configurations will be apparent in light of this disclosure.

In some embodiments, the luminaire 100 may be configured, for example, such that no two of its solid-state emitters 302 are pointed at the same spot on a given surface of incidence. Thus, there may be a one-to-one mapping of the solid-state lamps 116 of the luminaire 100 to the beam spots which it produces on a given surface of incidence to produce its light distribution area. This one-to-one mapping may provide for pixelated control over the light distribution area of the luminaire 100, in accordance with some embodiments. That is, the luminaire 100 may be capable of outputting a polar, grid-like pattern of light beam spots which can be manipulated (e.g., in intensity, etc.), for instance, like the regular, rectangular grid of pixels of a display. Like the pixels of a display, the beam spots produced by the luminaire 100 can have minimal or otherwise negligible overlap, in accordance with some embodiments. This may allow the light distribution area of the luminaire 100 to be manipulated in a manner similar to the way that the pixels of a display can be manipulated to create different static or dynamic patterns, spot shapes, and distributions of light, in accordance with some embodiments. Furthermore, the luminaire 100 may exhibit minimal or otherwise negligible overlap of the angular distributions of light of its solid-state emitters 302, and thus the candela distribution can be adjusted (e.g., in intensity, etc.) as desired for a given target application or end-use. As will be appreciated in light of this disclosure, however, the luminaire 100 also may be configured to provide for pointing two or more solid-state emitters 302 at the same spot (e.g., such as when color mixing using multiple color solid-state emitters 302 is desired), in accordance with some embodiments. In a more general sense, and in accordance with some embodiments, the solid-state lamps 116 may be mounted on a given surface of the housing 110 such that their orientation provides a given desired beam distribution from the luminaire 100 onto the ceiling.

In some embodiments, a touch-sensitive device or surface, such as a touchpad or other device with a touch-based user interface, may be utilized to control the solid-state emitters 302 of the solid-state lamps 116 of the luminaire 100 individually and/or in conjunction with one another. In some instances, the touch-sensitive interface may be operatively coupled with one or more controllers 502, which in turn interpret the input from the control interface 504 and provide the desired control signal(s) to one or more of the solid-state emitters 302 of the luminaire 100. In some other instances, the touch-sensitive interface may be operatively coupled directly with the solid-state emitters 302 to control them directly.

In some embodiments, a computer vision system that is, for example, gesture-sensitive, activity-sensitive, and/or motion-sensitive may be utilized to control the solid-state emitters 302 of the solid-state lamps 116 of the luminaire 100 individually and/or in conjunction with one another. In some such cases, this may provide for a luminaire 100 which can automatically adapt its light emissions based on a particular gesture-based command, sensed activity, or other stimulus. In some instances, the computer vision system may be operatively coupled with one or more controllers 502, which in turn interpret the input from the control interface 504 and provide the desired control signal(s) to one or more of the solid-state emitters 302 of the luminaire 100. In some other instances, the computer vision system may be operatively coupled directly with the solid-state emitters 302 to control them directly. Other suitable configurations and capabilities for a given controller 502 and the one or more control interfaces 504 will depend on a given application and will be apparent in light of this disclosure.

In some embodiments, the luminaire may include one or more sensor(s) 516, e.g. optical, acoustic and/or temperature sensors, configured to provide an associated output to the controller 502. The controller may control the light output from the solid-state lamps 116 at least in part in response to the output from the sensor(s) 516. For example, the sensor(s) 516 may include one or more optical sensors positioned outside of a building housing the luminaire 100. The optical sensor(s) 516 may provide to the controller 502 an output including a representative color pattern of the actual sky outside of the building, and the controller 502 may control the light output from the solid-state lamps 116 at least in part in response to the output from the sensor to mimic the color pattern of the actual sky outside the building.

As will be appreciated in light of this disclosure, the luminaire 100 also may be operatively coupled with other componentry, for example, which may be used in solid-state lighting fixtures, such as power conversion circuitry (e.g., electrical ballast circuitry to convert an AC signal into a DC signal at a desired current and voltage to power the solid-state devices), driver circuitry, and the like. Also, it should be noted that a luminaire 100 configured as described herein is not necessarily prevented, for example, from utilizing electromechanical components which have physical movement. For instance, in some cases, the luminaire 100 may be configured to host a microelectromechanical systems (MEMS) mirror array which provides reflective surfaces with adjustable foci. One or more of the solid-state lamps 116 may be made to illuminate a given mirror array, which in turn focuses the light in the desired direction out of the luminaire 100. Other suitable optional electromechanical components for the luminaire 100 will depend on a given application and will be apparent in light of this disclosure.

In some contexts or applications, the ceiling to be illuminated by the luminaire 100 may be larger than the light distribution area of the luminaire 100. In such contexts or applications, light emitted from multiple luminaires 100 may be coordinated by one or more system controllers to illuminate the ceiling 118 with a coordinated color gradients, e.g. static or dynamic color gradients that mimic the sky. For example, one luminaire 100 can illuminate the ceiling with a moving cloud and/or color gradient through its light distribution area and then an adjacent luminaire 100 may illuminate the ceiling with the moving cloud and/or color gradient beginning at the end of the light distribution area of the first luminaire 100, and so on. In a sense, the moving cloud and/or color gradient thus transitions from the light distribution area of one luminaire 100 to the light distribution area of an adjacent luminaire 100. In some embodiments, a more coarse representation of the sky may be achieved by adjusting light output color from each luminaire 100 on a luminaire level, as opposed to or in combination with, a pixelated level within each luminaire 100. For example, color gradients mimicking the sky near sunset can be achieved by having the west-most positioned luminaires 100 emit light having a more red appearance then the other luminaires 100.

Figure 6:
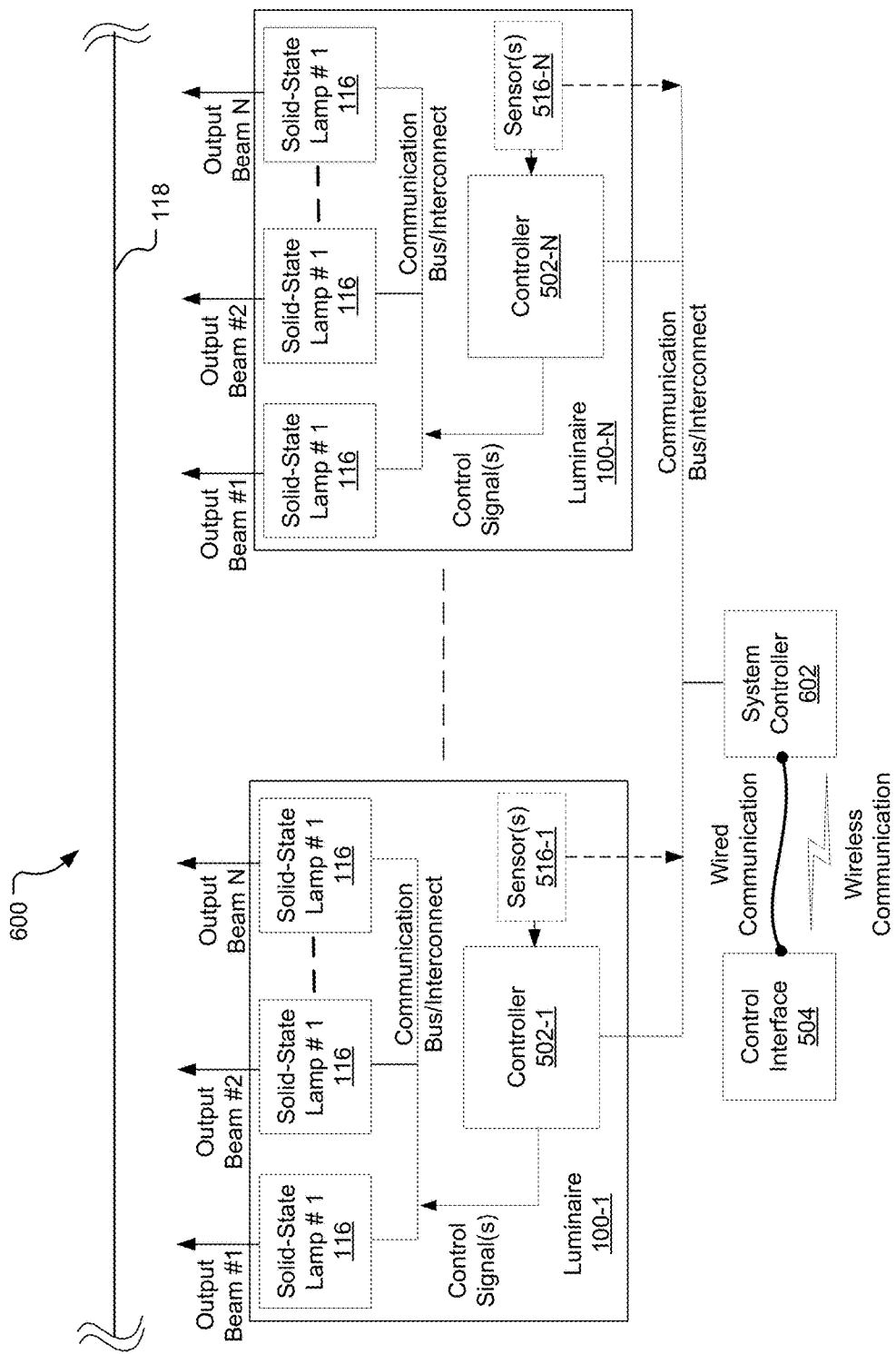
FIG. 6 is a block diagram of another embodiment of a lighting system consistent with the present disclosure.

Numerous suitable configurations for controlling multiple luminaires 100 to provide coordinated color gradients will be apparent in light of this disclosure. For example, FIG. 6 is a block diagram of a lighting system 600 including a plurality of the luminaires 100 1-N configured in accordance with an embodiment of the present disclosure. Each of the luminaires 100 1-N includes an associated controller 502 1-N operatively coupled (e.g., by a communication bus/interconnect) with the solid-state lamps 116 1-N of the luminaire 100 1-N. Each of the controllers 502 1-N may be configured as described above in connection the controller 502.

In the illustrated example embodiment, the controllers 502 1-N are communicatively coupled to a system controller 602 through a communication bus/interconnect. In some cases, the system controller 602 may communicate with the controllers 502 1-N utilizing a digital communications protocol, such as a digital multiplexer (DMX) interface, a Wi-Fi™ protocol, a digital addressable lighting interface (DALI) protocol, a ZigBee protocol, or any other suitable communications protocol, wired and/or wireless (e.g. radio-based or optical), as will be apparent in light of this disclosure. The system controller 602 is configured to output control signals on the communication bus/interconnect and may do so, for example, based on wired and/or wireless input received from one or more control interfaces 504, discussed above. The control signals from the system controller 602 coordinate light output from the luminaires 100 1-N singly and/or in combination to establish a coordinated color gradients on a ceiling 118 as described above.

In some embodiments, the control signals from the system controller 602 may be based on luminaire position information, such as the location of each luminaire 100 1-N with respect to the luminaires 100 1-N, the respective rotation of the luminaires 100 1-N, the distance of each luminaire 100 1-N from the ceiling 118, and the desired pattern to be emitted onto the ceiling by the luminaires 100 1-N. The position information may be pre-programmed into the system controller 602 and/or determined from one or more of the optional sensor(s) 516 1-N in the luminaires 100 1-N. In some embodiments, for example the sensor(s) 516 1-N in each luminaire 100 1-N may include acoustic or optical sensors, gyroscopes and/or accelerometers to determine the position of their associated luminaire's 100 1-N and provide signals representative of the luminaire position to the system controller 602 utilizing the communication bus/interconnect. In some embodiments, indoor positioning systems, such as Bluetooth beacons, may be used to obtain position information. The system controller 602 may then configure the control signals accounting for the respective and relative positions of the luminaires 100 1-N to coordinate light output from the luminaires 100 1-N singly and/or in combination to establish a coordinated illumination of a ceiling with static or dynamic color gradients, e.g. to mimic color gradients of the sky as described above.

Figure 7:
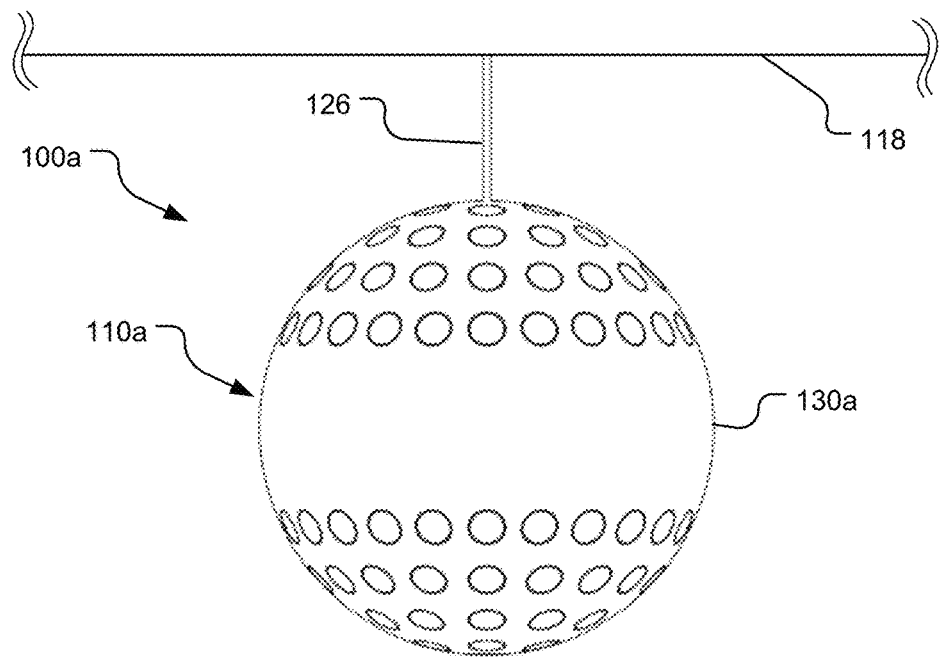
FIG. 7 is a side view of another embodiment of a luminaire consistent with the present disclosure.
Figure 8:
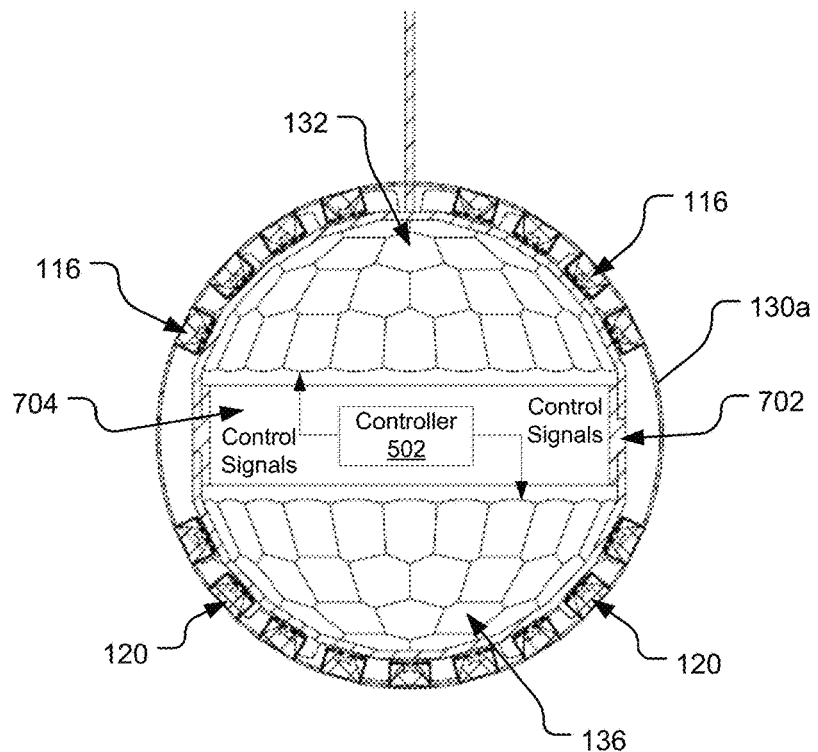
FIG. 8 is a sectional view of the luminaire shown in FIG. 7.

Also, as previously noted, the luminaire 100 may be configured as a lighting fixture which may be suspended from a given mounting surface, such as a pendant-type fixture, a sconce-type fixture, etc. For example, consider FIGS. 7 and 8, which illustrates a luminaire 100a configured in accordance with another embodiment of the present disclosure. As can be seen in this example case, housing 110a may exhibit a spherical geometry. The illustrated embodiment includes a cover 130a, a first circuit board 132 folded in a hemispherical shape and having the plurality of solid-state lamps 116 mounted thereon for providing up-lighting, and a second circuit board 136 folded in a hemispherical shape and having the plurality of solid-state lamps 120 mounted thereto for providing down-lighting. The first circuit board 132 and the second circuit board 136 are coupled at their perimeters by a circular connector 702 having a t-shaped cross-section thereby forming a plenum 704 in the luminaire.

The controller 502 may be mounted in the plenum 704 for providing control signals to the solid-state lamps 116 and the solid-state lamps 120, although in other embodiments the controller 502 may be mounted separately from the luminaire 100a or each of the solid-state lamps 116, 120 may have its own controller, as discussed above. The plurality of solid-state lamps 116 are arranged on the upper portion of the housing 100a to illuminate a ceiling 118 with color gradients in response to control signals from the controller 502. The solid-state lamps 120 on the bottom portion of the housing 100a provide down-lighting in the environment in response to the control signals from controller 502.

The cover 130a may be disposed over the plurality of solid-state lamps 116 and the plurality of solid-state lamps 120 with the plurality of solid-state lamps 116 and the plurality of solid-state lamps 120 positioned between the exterior surface of the printed circuit boards 132 and 136, respectively, and interior surface of the cover 130a. The cover 130a may include a plurality of apertures therein. Each of the plurality of solid-state lamps 116 and the plurality of solid-state lamps 120 may have an end portion positioned in an associated one of the apertures on the cover 130a so that light emitted from the plurality of solid-state lamps 116 and the plurality of solid-state lamps 120 exits the housing 100a. The cover 130a protects or otherwise houses the plurality of solid-state lamps 116 and the plurality of solid-state lamps 120 of the luminaire 100a within space between the cover 130a and the circuit boards 132, 136.

As will be appreciated in light of this disclosure, however, a housing 110 is not limited only to the example geometries depicted herein. The housing 110 may be configured with any of the various types of geometries (e.g., non-planar/curved, such as sectional hemispherical, oblate hemispherical, concave, convex, cylindrical, elliptical, parabolic, hyperbolic, complex parabolic; Platonic solid-type, such as triangular, rectangular, trapezoidal, pyramidal, truncated pyramidal) Numerous suitable configurations will be apparent in light of this disclosure.

Figure 9:
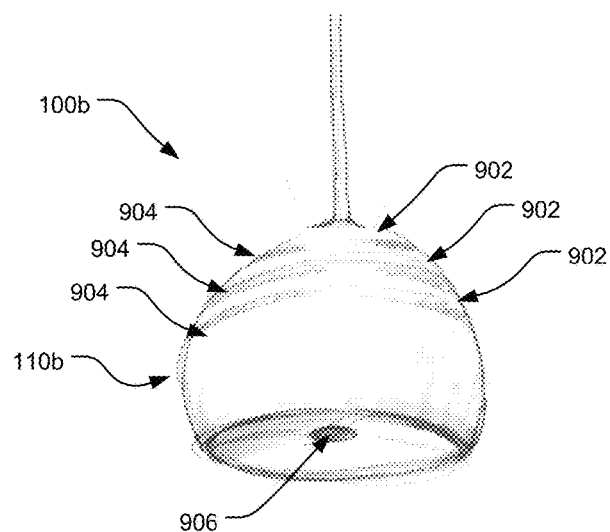
FIG. 9 is a perspective view of another embodiment of a luminaire consistent with the present disclosure.

FIG. 9, for example, illustrates an example of a luminaire 100b consistent with the present disclosure including housing 110b having a generally wine glass-shape. In the illustrated exemplary embodiment, solid-state lights mounted to the interior top surface of the housing 100b provide up-lighting through one or more translucent color tracks 902 separated by ventilation spaces 904. The color tracks 902 may be constructed of an optical components, such as, for example: a reflector; a diffuser; a polarizer; a brightness enhancer; and/or a phosphor material (e.g., which converts light received thereby to light of a different wavelength) to impart a desired effect to the up-lighting from the luminaire 100b. The illustrated embodiment may also include optional solid-state or lamps for providing down-lighting, e.g. through an aperture 906 in the bottom of the housing 110b and/or through an optical component closing the bottom of the housing 110b.

Figure 10:
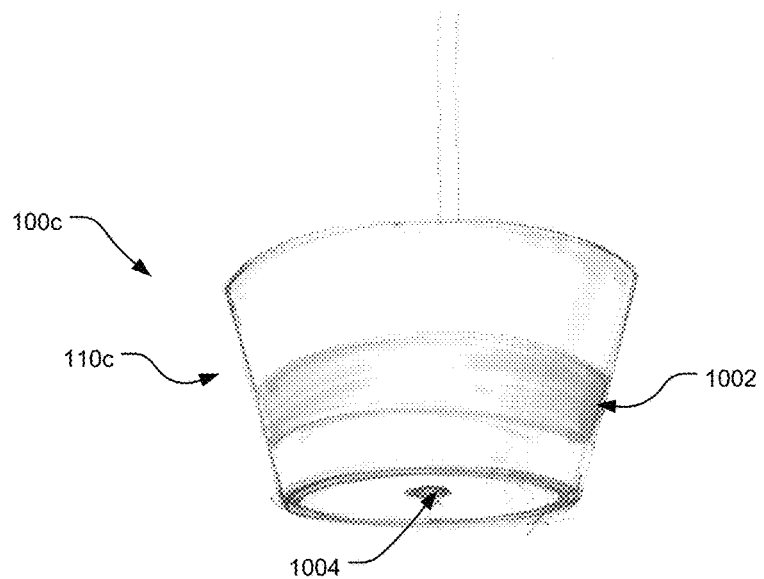
FIG. 10 is a perspective view of another embodiment of a luminaire consistent with the present disclosure.

FIG. 10 illustrates another example of a luminaire 100 consistent with the present disclosure including housing 100c having a generally frustoconical shape. In the illustrated exemplary embodiment, solid-state lights mounted to the interior top surface of the housing 100c provide up-lighting. A pattern of ventilation spaces 1002 may be provided through the side surface of the housing. The illustrated embodiment may also include optional solid-state or lamps for providing down-lighting, e.g. through an aperture 1004 in the bottom of the housing 100c and/or through an optical component closing the bottom of the housing 100c.

Figure 11:
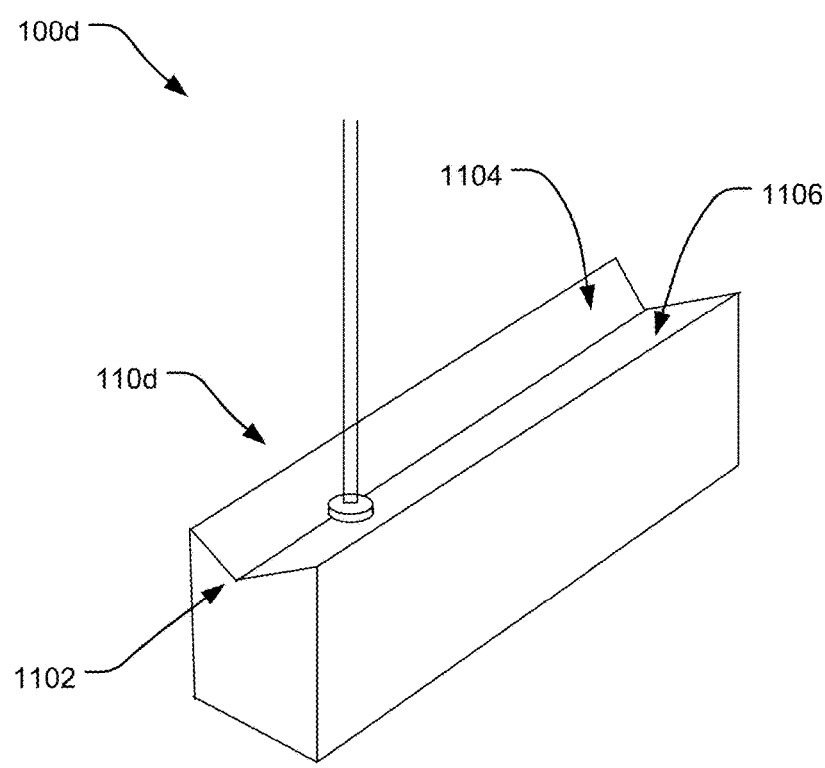
FIG. 11 is a perspective view of another embodiment of a luminaire consistent with the present disclosure.

FIG. 11 illustrates another example of a luminaire 100 consistent with the present disclosure including housing 100d having a generally elongate rectangular shape with a v-shaped notch 1102 in the top portion thereof. In the illustrated exemplary embodiment, solid-state lights mounted to the interior top surface of the housing provide up-lighting through opposing panels 1104, 1106 of the v-shaped notch 1102.

Numerous embodiments will be apparent in light of this disclosure. One example embodiment provides a luminaire including: a housing; a plurality of solid-state lamps arranged on the housing, in which each of the plurality of solid-state lamps is configured to emit light upwardly toward a ceiling, and a controller communicatively coupled the plurality of solid-state lamps and configured to provide one or more control signals for controlling the plurality of solid-state lamps to provide a combined light output configured to illuminate the ceiling with a color gradient.

Another example embodiment provides a luminaire including: a housing; a plurality of solid-state lamps arranged on the housing, in which each of the plurality of solid-state lamps is configured to emit light upwardly toward a ceiling, and a controller communicatively coupled the plurality of solid-state lamps and configured to provide one or more control signals to control the plurality of solid-state lamps independently of one another to provide a combined light output configured to illuminate the ceiling with a color gradient that mimics a color gradient of a sky, the color gradient including at least one moving pattern in at least one light distribution area of at least one of the plurality of solid-state lamps.

Another example embodiment provides a lighting system including: a plurality of luminaires, each of the plurality of luminaires including an associated housing, and an associated plurality of solid-state lamps arranged on the associated housing, in which each of the associated plurality of solid-state lamps is configured to emit light upwardly toward a ceiling. The system further includes at least one system controller configured to provide one or more control signals for controlling the plurality of luminaires to coordinate a combined output of the associated solid-state lamps of the plurality of luminaires to illuminate the ceiling with a color gradient.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, controller 502 and or system controller 602 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "controller", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, a "circuit" or "circuitry" may include, for example, singly or in any combination, hardwired circuitry, programmable circuitry, state machine circuitry, and/or firmware that stores instructions executed by programmable circuitry.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Spatially relative terms, such as "beneath," below," upper," "lower," "above", "left", "right" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer or section could be termed a second element, component, region, layer or section without departing from the scope and teachings of the present disclosure.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A luminaire comprising:
a housing;
a plurality of solid-state lamps arranged on the housing, wherein each of the plurality of solid-state lamps is configured to emit light upwardly toward a ceiling and at least a portion of the housing has a hemispherical shape and the plurality of solid-state lamps are arranged on a hemispherical exterior surface of the housing, and
a controller communicatively coupled the plurality of solid-state lamps and configured to provide one or more control signals for controlling the plurality of solid-state lamps to provide a combined light output configured to illuminate the ceiling with a color gradient.

2. The luminaire of claim 1, wherein the color gradient is configured to mimic a color gradient of a sky.

3. The luminaire of claim 1, wherein control signals control the plurality of solid-state lamps to change the color gradient over time.

4. The luminaire of claim 1, wherein the color gradient includes at least one moving pattern in at least one light distribution area of at least one of the plurality of solid-state lamps.

5. The luminaire of claim 1, wherein a second plurality of solid-state lamps are arranged on a hemispherical interior surface of the housing wherein each of the second plurality of solid-state lamps is configured to emit light downwardly.

6. The luminaire of claim 1, wherein the housing has a spherical shape and the plurality of solid-state lamps are arranged on a top surface of the housing and a second plurality of solid-state lamps are arranged on a bottom surface of the housing, wherein each of the second plurality of solid-state lamps is configured to emit light downwardly.

7. The luminaire of claim 6, wherein the controller is disposed in the housing.

8. The luminaire of claim 1, wherein the plurality of solid-state lamps are electronically controlled independently of one another by the controller.

9. A luminaire comprising:
a housing;
a plurality of solid-state lamps arranged on the housing, wherein each of the plurality of solid-state lamps is configured to emit light upwardly toward a ceiling and at least a portion of the housing has a hemispherical shape and the plurality of solid-state lamps are arranged on a hemispherical exterior surface of the housing, and
a controller communicatively coupled the plurality of solid-state lamps and configured to provide one or more control signals to control the plurality of solid-state lamps independently of one another to provide a combined light output configured to illuminate the ceiling with a color gradient that mimics a color gradient of a sky, the color gradient including at least one moving pattern in at least one light distribution area of at least one of the plurality of solid-state lamps.

10. A lighting system comprising:
a plurality of luminaires, each of the plurality of luminaires comprising
an associated housing, and
an associated plurality of solid-state lamps arranged on the associated housing, wherein each of the associated plurality of solid-state lamps is configured to emit light upwardly toward a ceiling; and
at least one system controller configured to provide one or more control signals for controlling the plurality of luminaires to coordinate a combined output of the associated solid-state lamps of the plurality of luminaires to illuminate the ceiling with a color gradient;
wherein each of the plurality of luminaires further comprises an associated controller communicatively coupled with the at least one system controller and the associated the plurality of solid-state lamps and configured to electronically control light emitted by the associated plurality of solid-state lamps.

11. The lighting system of claim 10, wherein the color gradient is configured to mimic a color gradient of a sky.

12. The lighting system of claim 10, wherein control signals control the plurality of luminaires to change the color gradient over time.

13. The lighting system of claim 10, wherein the color gradient includes at least one moving pattern that moves from a light distribution area of a first one of the plurality of luminaires to a light distribution area of another one of the plurality of luminaires.

14. The lighting system of claim 10, wherein one or more of the plurality of luminaires comprises a sensor configured to provide an output to the system controller representative of a position of the one or more luminaires.

15. The lighting system of claim 10, wherein at least a portion of at least one of the associated housings has a hemispherical shape and the associated plurality of solid-state lamps are arranged on a hemispherical exterior surface of the at least one of the associated housings.

16. The lighting system of claim 15, the system further comprising a second plurality of luminaires arranged on a hemispherical interior surface of the at least one of the associated housings wherein each of the second plurality of solid-state lamps is configured to emit light downwardly.

17. The lighting system of claim 10, wherein at least one of the associated housings has a spherical shape and the associated plurality of solid-state lamps are arranged on a top surface of the at least of the associated housings and a second plurality of solid-state lamps are arranged on a bottom surface of the at least one of the associated housings, wherein each of the second plurality of solid-state lamps is configured to emit light downwardly.

\* \* \* \* \*